Figure 1:
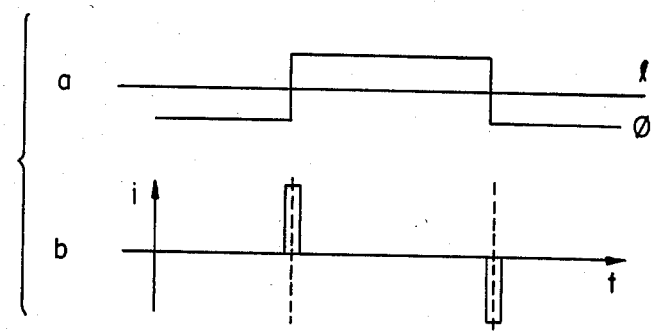

United States Patent [19]

Bauer

[11] Patent Number: 4,600,954
[45] Date of Patent: Jul. 15, 1986

[54] INSTALLATION FOR RECORDING AND RECOVERING BINARY SIGNALS ON A MAGNETIC INFORMATION CARRIER

[76] Inventor: Norbert Bauer, Volckamerstr. 14, 8520 Erlangen, Fed. Rep. of Germany

[21] Appl. No.: 625,979

[22] Filed: Jun. 29, 1984

[30] Foreign Application Priority Data

Jun. 29, 1983 [DE] Fed. Rep. of Germany ....... 3323336
Jun. 29, 1983 [DE] Fed. Rep. of Germany ....... 3323335
Jun. 5, 1984 [DE] Fed. Rep. of Germany ....... 3420927

[51] Int. Cl.$^4$ ........................... G11B 5/02; G11B 5/09
[52] U.S. Cl. ......................................... 360/67; 360/46
[58] Field of Search ................................... 360/67, 46

[56] References Cited

U.S. PATENT DOCUMENTS 4,346,411 8/1982 Buhler et al. ................. 360/67
4,495,529 1/1985 Gustafson ..................... 360/67

Primary Examiner—Vincent P. Canney
Attorney, Agent, or Firm—Craig & Burns

[57] ABSTRACT

An installation for recording binary signals on a magnetic information carrier, in which a needle pulse of one polarity is applied to a recording magnetic head during each change of the signals to be recorded from "0" to "1" and a needle pulse of the other polarity is applied during each change from "1" to "0". The installation includes either two multivibrators or a single multivibrators. The output signals of the two multivibrators are applied to the magnetic head by way of an adding circuit whereas the output signal of the single multivibrator is applied to the magnetic head by way of a logic circuit which reverses the current direction corresponding to the existing data signal. Additionally, an installation for the recovery of binary signals recorded on a magnetic information carrier determines the zero passage of the read-out signal and includes three comparators which compare the read-out signal with predetermined threshold voltages. Only if the output signals of the comparators occur in a predetermined sequence, a received signal is identified as read-out signal.

4 Claims, 8 Drawing Figures

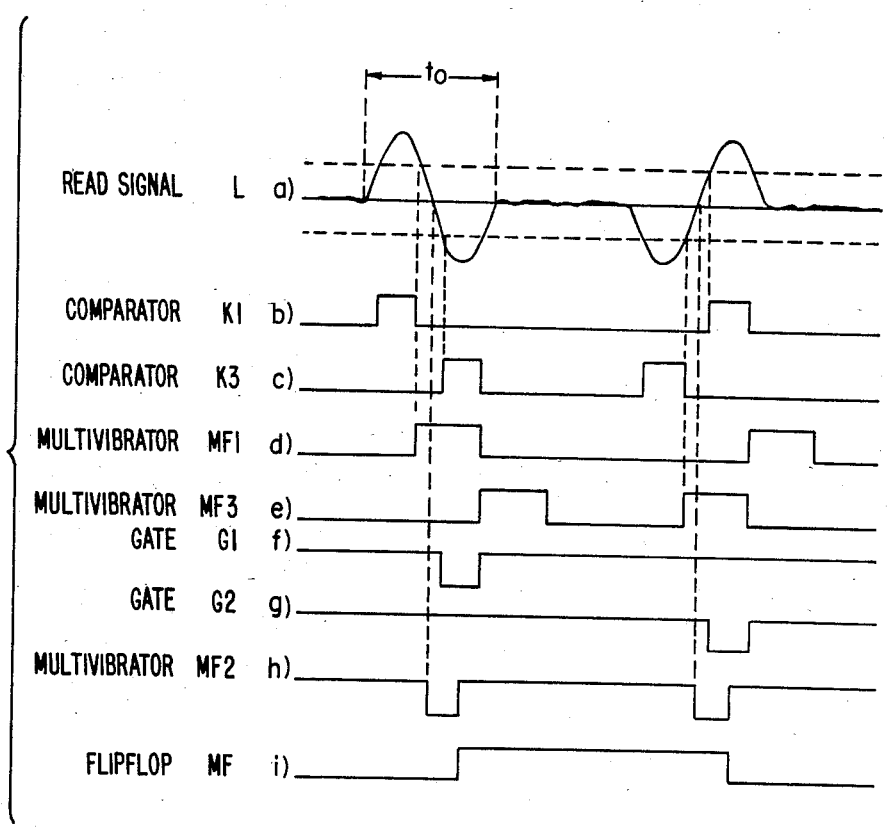

INSTALLATION FOR RECORDING AND RECOVERING BINARY SIGNALS ON A MAGNETIC INFORMATION CARRIER

The present invention relates to an installation for recording binary signals on a magnetic information carrier (input-output media) as well as to an installation for recovering the binary signals from the read-out signal of the magnetic information carrier.

In a known method for recording binary signals on a magnetic information carrier, such as a magnetic tape or a magnetic disk, the binary signal "one" (1) is represented by a positive magnetization and the binary signal "zero" (0) by a negative magnetization of the information carrier. With "helical-scan" recorders having a rotating head transmitter it must be assured with the aid of a special channel coding that the binary signal is free of d.c. current. If one now records with a high density of flux changes, the read-out signal cannot be used directly for the recovery of the binary signal. The read-out signal is then customarily initially differentiated after interference suppression in order to evaluate the thus resulting zero passages. However, the differentiation reduces the signal-to-noise ratio.

Consequently, a method for recording binary signals on a magnetic information carrier is described in the not pre-published German Patent Application No. P 31 50 417.5, which permits a recording also with a high density of flux changes without d.c. current component.

In the method described in this patent application, exclusively the change of the signal from "1" to "0" respectively from "0" to "1" successive binary signals is recorded in the form of correspondingly directed positive, respectively, negative needle pulses. The track elements of the magnetic information carrier between two successive needle pulses are thereby not magnetized. The duration of the needle pulses is selected so short that a magnetization of the magnetic particles barely effects a flux change on the recording medium, for example, a magnetic tape or a magnetic disk. The duration of the read-in or write-in pulses can thus be so short that the relative velocity between magnetic head and information carrier has no significant influence on the shape of the applied magnetization, and that the magnetization is produced mostly perpendicular to the movement direction of the information carrier. The shape of the read-in or write-in pulse is thereby without influence on the resulting magnetization whereby the practical realization is greatly facilitated.

In the German Patent Application No. P 31 50 418.3, which also has not been pre-published, a method for the recovery of the binary signals from the read-out signal of magnetic information carriers is disclosed which have been written-in or recorded according to the aforementioned method. A symmetrical signal with a zero passage results as read-out signal at the location of the read-in pulse. This zero passage can be evaluated during the signal recovery directly and without additional differentiation.

The circuits disclosed in the two aforementioned German patent application Nos. P 31 50 417.5 and P 31 50 418.3 for the recording and the recovering of the binary signals are designed for extremely high data rates of the order of magnitude of 40 Mbit/second and are thus constructed in a relatively complicated manner. For low pulse repetition frequencies of, for example, 19.2 kBaud, as are required, for example, for the RS232C-interface, the circuits proposed in the aforementioned patent applications are too complicated and too costly.

Accordingly, it is the object of the present invention to provide simple and operationally reliable installations for recording and recovering binary signals on a magnetic information carrier (magnetic input-output media), in which a needle pulse of positive polarity is to be recorded on, respectively, read from the information carrier with each change of the signal to be recorded from "0" to "1" and a needle pulse of negative polarity is to be recorded, respectively, read during each change of the signal to be recorded from "1" to "0".

The underlying problems are solved according to the present invention in that two single-shot multivibrations (monostable trigger circuits) are provided, to the trigger inputs of which are applied the signals to be recorded, and of which one multivibrator produces a pulse of one polarity and of the duration $t_i$ with each rising edge of the signal to be recorded and the other multivibrator produces a pulse of the other polarity and of the duration $t_i$ with each decreasing edge, and in that a summation circuit adds the output pulses of the multivibrators and applies current pulses of the duration $t_i$ to the magnetic head. In the alternative, the underlying problems are solved according to the present invention in that, one multivibrator is provided, to the trigger input of which is applied the signal to be recorded, and which produces a current pulse of the duration $t_i$ with a change of the signal to be recorded from "0" to "1", respectively, vice versa, and in that a logic circuit reverses the direction in which the current pulse flows through the magnetic head when the signal to be recorded changes from "0" to "1", respectively, from "1" to "0". For the recovery of the binary signals the underlying problems are solved according to the present invention in that three comparators are provided which compare the read-out voltage with a positive threshold voltage and an equally large negative threshold voltage as well as with a voltage lying between these two voltages, and in that three multivibrators are provided, of which a first multivibrator produces a pulse of predetermined length when exceeding the positive threshold voltage from the positive side of the read-out signal, as determined by one comparator, and the second monoflop produces a pulse of predetermined duration when exceeding the negative threshold voltage from the negative side of the read-out signal, as determined by the second comparator, and the third monoflop produces a pulse of predetermined duration at the instant when the read-out signal passes through zero, as determined by the third comparator, and in that a flip-flop is provided which is set by the output signals of the first and second multivibrator as well as of the second comparator and is reset by the output signals of the second multivibrator and the third comparator as well as of the first comparator and whose output signal represents the recovered data signal.

All of the installations according to the present invention for recording binary signals offer the advantage that a very high recording density of, for example, 2000 bits/mm of the magnetic track is possible with pulse repetition frequencies of 19.2 kBaud and thereabove.

In the first-mentioned recording installation according to the present invention as described above,, the data to be recorded are applied to the trigger inputs of two multivibrators, of which one multivibrators produces a pulse having a duration $t_i$ with a rising edge of the data pulses to be recorded and the other multivibrator produces a pulse of the same duration with a decreasing edge of the data pulses to be recorded. The output signals of the two multivibrators are added. According to another feature of the present invention, the added signal, which contains pulses of different polarity, is differentiated by a differentiating circuit. The output signal of the differentiating circuit is applied to the magnetic head so that similar types of current pulses flow through the magnetic head. The pulse duration $t_i$ of the two multivibrators is dependent on the properties of the magnetic carrier material and of the magnetic head; it can be determined, for example, by conventional measurement techniques and adjusted correspondingly.

If the differentiating circuit includes an operational amplifier, to the inverting input of which is connected one connection of a capacitor whose other connection is connected with the output of the adding circuit, one obtains the further advantage that the magnetic head is current-controlled with low ohmic resistive values. The properties of the feed line thereby play a subordinate role so that very short current pulses can be achieved in the magnetic head.

In the second-mentioned arrangement according to the present invention for recording the signals, the duration of both the negative as well as of the positive pulse to be recorded is determined by a single monoflop. The requirement for pulses of exactly equal length with the duration $t_i$ is therewith assured independently of tolerances of structural parts. Therebeyond, the voltage pulses $+U_v$ and $-U_v$ which are applied at the magnetic head, are exactly equally large in their absolute value since the pulses are derived from the same operating voltage $U_v$.

In the installation according to the present invention for the recovery of binary signals as described above, the read-out voltage is compared by three comparators with a positive and an equally large negative value as well as with a zero voltage lying therebetween. Three multivibrators connected in the output of the comparators produce a pulse of predetermined length when exceeding a positive threshold voltage from the positive side of the read-out signal, when exceeding a negative threshold voltage from the negative side of the read-out signal as well as at the instant of a detected zero passage. These pulses are applied by way of AND-elements with negated output to the S- and the R-input of a flip-flop.

As a result thereof, it is possible to differentiate between valid zero passages and those which are caused by background noise and interferences during the recovery of the binary signal from the read-out signal of the magnetic recording carrier so that an operationally reliable recovery of the data signal is possible with relatively small circuit expenditures.

According to a further feature in accordance with the present invention, a circuit is provided for storing the peak value of the maximum read-out signal in the positive and in the negative direction, and the positive threshold voltage is adjusted to 20% of the positive peak value of the read-out voltage and the negative threshold voltage to 20% of the negative peak value of the read-out voltage.

According to still a further feature of the present invention, the duration of the pulses of the monoflops which switch when exceeding the positive and the negative threshold voltage, is equal to half the read-out pulse duration, and the duration of the pulses of the monoflop which switches during a zero passage is adjusted equal to one-fourth of the read-out pulse duration.

Figure 2:
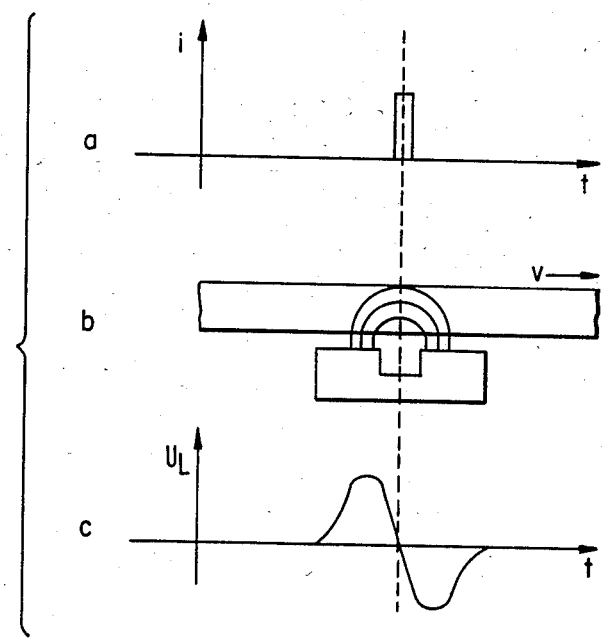
Figure 3:
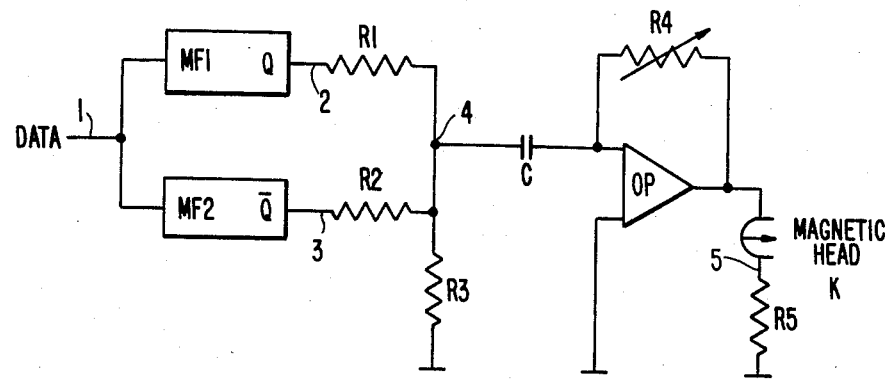
Figure 4:
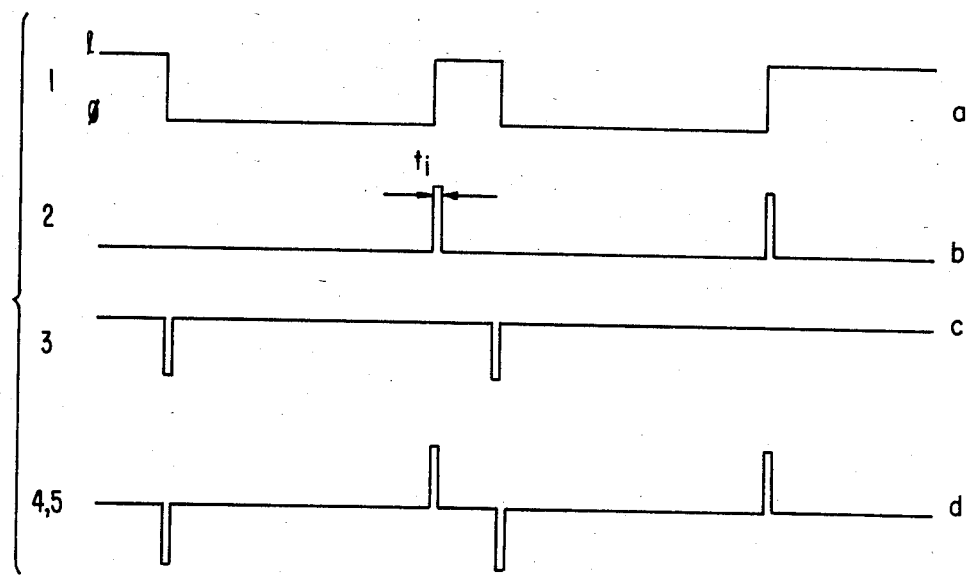
Figure 5:
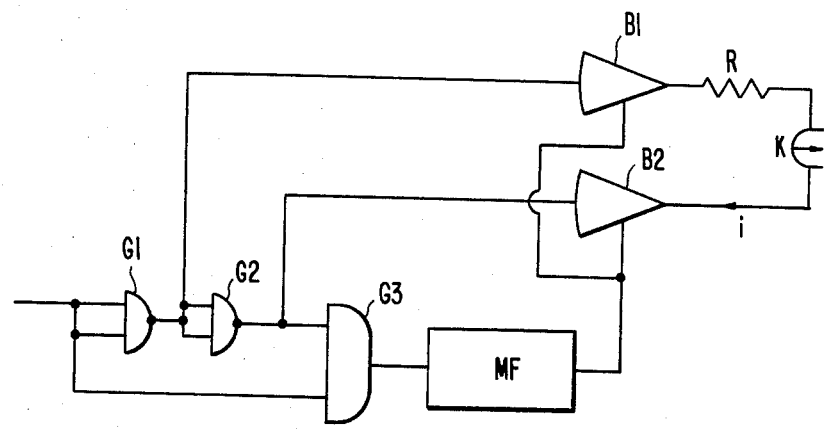
Figure 6:
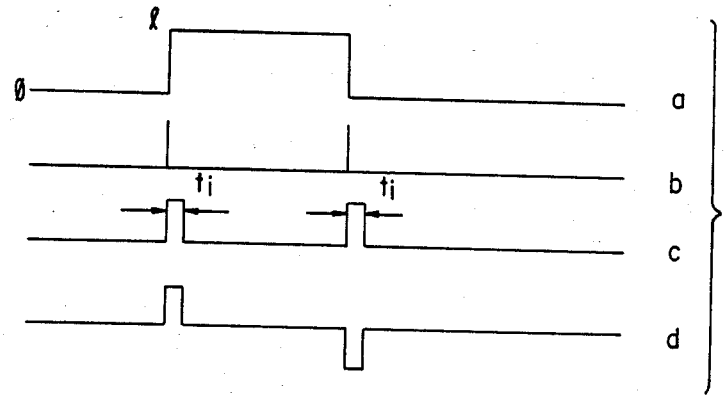
Figure 7:
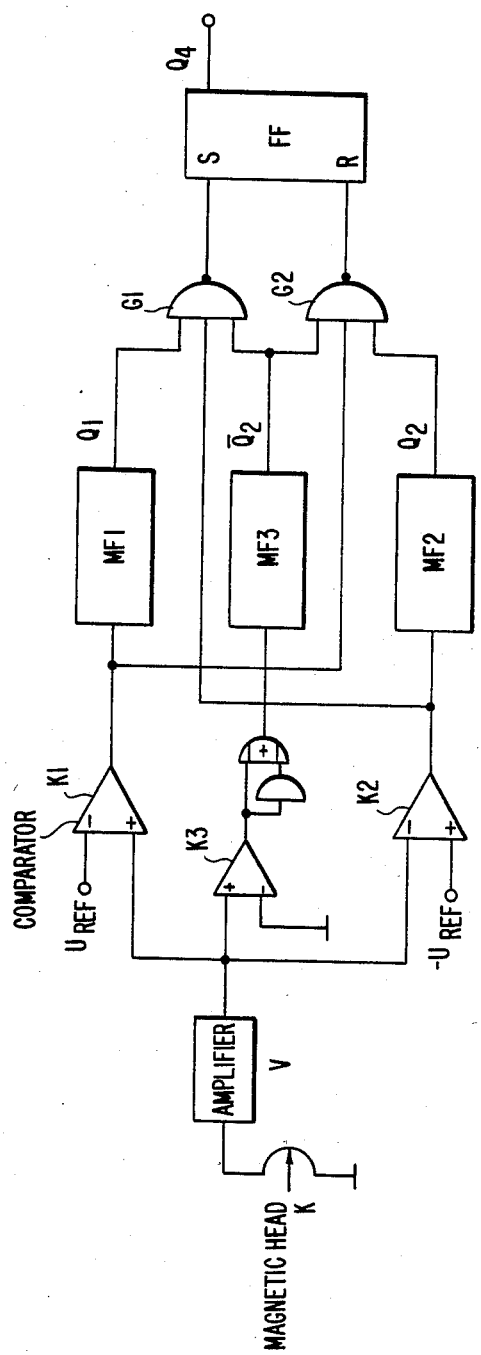

These and other objects, features and advantages of the present invention will become more apparent from the following description when taken in connection with the accompanying drawing which shows, for purposes of illustration only, several embodiments in accordance with the present invention, and wherein:

FIG. 1, consisting of a and b, is a diagram illustrating the principle from which starts the present invention;

FIG. 2, consisting of a-c, is a diagram illustrating schematically the progress of the recording operation according to the principle of the present invention;

FIG. 3 is a block diagram of a first embodiment of an installation in accordance with the present invention for recording binary data;

FIG. 4, consisting 4a-4d, is a pulse/time diagram of the embodiment illustrated in FIG. 3;

FIG. 5 is a block diagram of a second embodiment of an installation in accordance with the present invention for recording binary data;

FIG. 6, consisting of a-d, is a pulse/time diagram of the embodiment illustrated in FIG. 5;

FIG. 7 is an embodiment of an installation according to the present invention for the recovery of binary signals recorded on a magnetic information carrier; and FIG. 8, consisting of a-i, is a pulse/time diagram of the embodiment illustrated in FIG. 7.

Referring now to the drawing wherein like reference characters are used throughout the various views to designate like parts, FIG. 1 explains the recording principle from which starts the present invention. According to this recording principle, each rising data edge produces, for example, a positive read-in or write-in pulse and each decreasing data flank produces, for example, a negative read-in or write-in pulse. This means that, if for example, two positive data signals follow one another, no recording takes place. It is thus necessary for the complete recovery of the recorded data to use a time basis, respectively, timing pulses in order to be able to determine the number of the signals "1", respectively, "0" which directly follow one another.

FIG. 1a illustrates an example for a data signal and FIG. 1b the associated development of the read-in or write-in currents flowing through a magnetic head.

The pulse duration of the (current) read-in pulses is selected so short that the relative velocity between magnetic head and information carrier has no significant influence on the shape of the applied magnetization. Under these prerequisites, also the shape of the read-in or write-in pulses is without noticeable influence on the resulting magnetization.

FIG. 2 illustrates this schematically. Since practically no local displacement occurs according to the aforementioned assumption during the read-in pulse duration (FIG. 2a) of the information carrier, for example, of a magnetic tape or of a magnetic disk moving with the velocity v, a reproduction of the magnetic head field of a magnetic head K results on the information carrier as permanent magnetization (FIG. 2b). A symmetrical signal results as read-out voltage with a zero passage at the location of the write-in or read-in pulse (FIG. 2c). This zero passage can be evaluated directly during the signal recovery, i.e., without any additional differentiation.

FIG. 3 illustrates a first embodiment of an installation according to the present invention for recording binary data. The installation includes two multivibrators (monostable trigger circuits) MF1 and MF2 whose outputs are connected by way of resistances R1 and R2 both with the one connection of a condenser C as also with the one connection of a resistance R3 serving as adding resistance. The other connection of the condenser C is connected with the inverting input of an operational amplifier OP, in the feedback of which is connected a variable resistance R4, and whose output is connected with the magnetic head K.

The manner of operation of the illustrated circuit will be described more fully hereinafter by reference to FIG. 4.

The data pulses D (FIG. 4a) are applied to the inputs of the two multivibrators MF1 and MF2. The multivibrator MF1 supplies a pulse of short pulse duration during each positive edge of the data pulses (FIG. 4b) whereas the multivibrator MF2 supplies a pulse during each negative edge of the data pulses D (FIG. 4c). The pulse duration $t_i$ which is adjusted identically for the two multivibrators, depends on the properties of the magnetic carrier material and of the magnetic head K and must be empirically determined prior to the adjustment of the multivibrators.

The voltage-output signals of the two multivibrators are added by the adding resistance R3 so that a voltage signal corresponding to FIG. 4d appears at the input connection of the differentiating circuit consisting of the condenser C, the operational amplifier OP and the resistance R4.

Since the curve of the current with respect to time in the magnetic head K is proportional to the integral of the voltage at its connections, and since the differentiated signal according to FIG. 4d is present at the magnetic head K, current pulses flow through the magnetic head K, whose shape corresponds also to the shape of the pulses shown in FIG. 4d. The use of a differentiating circuit as "coupling stage" for coupling the voltage signal to the magnetic head K offers the advantage that firstly the average value of the signal is zero and that secondly the differentiated signal is fed to the magnetic head K through a circuit of low ohmic value. As a result of the low ohmic "voltage control" of the magnetic head, the properties of the input lines play a subordinate role so that short current pulses can be achieved in the magnetic head.

FIG. 5 illustrates a second embodiment of an installation according to the present invention for recording binary signals on a magnetic information carrier. The data to be recorded are applied to the two inputs of an AND-element G1 with negated output as well as to one input of an AND-element G3. The output of the AND-element G1 is connected with the input of a first tristate buffer B1 as well as with the two inputs of an AND-element G2 having a negated output. The output of the AND-element G2 is connected with the other input of the AND-element G3 as well as with the input of a second tristate buffer B2. The output of the AND-element G3 is connected with a multivibrator MF, whose Q-output connection is connected with the disable inputs of the tristate buffers B1 and B2. The output of the tristate buffer B1 is connected by way of a resistance R with one connection of a magnetic head K whose other connection is connected with the output of the tristate buffer B2.

The manner of operation of the circuit illustrated in FIG. 5 will be explained hereinafter by reference to FIG. 6.

The inverted data signal is present at the input of the tristate buffer B1 and the non-inverted data signal is present at the input of the tristate buffer B2 (FIG. 6a).

By reason of the timing properties of the AND-elements G1 to G3, the pulse peaks illustrated in FIG. 6b are present at the input of the multivibrator MF, on the basis of which the multivibrator MF produces the pulses with a duration $t_i$ as shown in FIG. 6c. During the duration of the output pulse of the multivibrator MF, the outputs of the tristate buffers B1 and B2 are at the potential "high", respectively, "low" of the logic circuit (with CMOS circuits "low" corresponds to the ground potential and "high" to the positive operating voltage of preferably 15 volts) corresponding to the signal existing at its input. As a result thereof, voltages pulses are present at the one or the other connection of the magnetic head K corresponding to the dropping-off or rising data flank. Since the pulses are derived from the same operating voltage $U_\nu$, they are exactly equally large corresponding to the requirement. The magnetizing current I decisive for the recording is produced by the resistance R. Its value determines the strength of the magnetization, while the amplitude of the switched-over voltage $U_\nu$ has predominantly an influence on the current increase velocity in the magnetic head.

Since furthermore a single multivibrator MF determines the duration of all pulses, the pulse durations are always exactly equal.

At the end of a pulse with the duration $t_i$, the tristate buffers B1 and B2 are switched by the multivibrator MF into a high ohmic condition, hence the magnetizing current will thus become zero.

FIG. 7 illustrates an embodiment of an installation according to the present invention for the recovery of binary informations recorded on a magnetic information carrier (input-output media). The read-out signal L obtained by a magnetic head K and symmetrical to 0 is amplified by an amplifier V whose output is connected with the inputs of three comparators K1, K2, K3. The output of the comparator K1 is connected with the input of a multivibrator MF1 as well as with one input of an AND-element G2 having three inputs and a negated output.

The output of the comparator K2 is connected with the input of a multivibrator MF2 as well as with one input of an AND-element G1 having three inputs and a negated output.

The output of the comparator K3 is connected by way of the illustrated gate network with the input of a monoflop MF3.

The Q-output of the monoflop MF1 is connected with the AND-element G1, the Q-output of the monoflop MF2 is connected with the AND-element G2 and the Q-output of the monoflop MF3 with both AND-elements.

The outputs of the AND-elements G1 and G2 are connected with the S and R-input, respectively, of a flip-flop FF.

The manner of operation of the circuit illustrated in FIG. 7 will be explained hereinafter by reference to FIG. 8.

With valid read-out pulses (FIG. 8a) the three reference levels are traversed in alternating sequence but always within a predetermined time. This time depends on the read-out pulse width and therewith on the recording parameters and can be presumed as known.

If, for example, the level $+U_{rev}$ is exceeded in the direction of the zero line, then the level $-U_{rev}$ must be reached within a period of time adjustable by means of the multivibrator MF1. If this condition is fulfilled, a time window is opened by means of the gate G1 (FIG. 2f). The zero passage lying between the reference levels sets the flip-flop FF to the logic "high" (FIGS. 2h and 2i) delayed by way of the multivibrator MF3.

With a read-out signal with positive rise, the comparator levels are traversed in reverse sequence. A time window is again opened by means of the multivibrator MF2 and by way of the gate G2 (FIG. 8g). The zero passage now takes care for a resetting of the flip-flop FF to "low".

In every case, the recovered data (FIG. 2i) are present at the output of the flip-flop.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An installation for recovering binary signals recorded on a magnetic information carrier and determined by the magnetization direction, which is operable on the basis of the detection of the zero passage of the magnetization between successive tracking elements of the information carrier, comprising three comparator means which compare the read-out voltage with a positive threshold voltage and with an equally large negative threshold voltage as well as with a voltage lying between said two threshold voltages, three multivibrator means, a first one of said multivibrator means producing a pulse of predetermined length when exceeding the positive threshold voltage from the positive side of the read-out signal, as determined by the first comparator means, the second multivibrator means being operable to produce a pulse of predetermined duration when exceeding the negative threshold voltage from the negative side of the read-out signal as determined by the second comparator means, and the third multivibrator means producing a pulse of predetermined length at the instant of zero passage of the read-out signal as determined by the third comparator means, and flip-flop means operable to be set by the output signals of said first and said third multivibrator means as well as of the second comparator means and to be reset by the output signals of the second multivibrator means and of the third multivibrator means as well as of the first comparator means, the output signal of said flip-flop means representing the recovered data signals.

2. An installation according to claim 1, further comprising circuit means for storing the peak values of the maximum read-out voltage in a positive and negative direction, and means for adjusting the positive threshold voltage to about 20% of the positive peak value and for adjusting the negative threshold voltage to about 20% of the negative peak value of the read-out voltage.

3. An installation according to claim 2, wherein the duration of the pulses from the first and second multivibrator means are equal to half the read-out pulse duration and the duration of the pulses of the third multivibrator means are substantially equal to one-fourth of the read-out pulse duration.

4. An installation according to claim 1, wherein the duration of the pulses from the first and second multivibrator means are equal to half the read-out pulse duration and the duration of the pulses of the third multivibrator means are substantially equal to one-fourth of the read-out pulse duration.

* * * * *